United States Patent
Yoon (10) Patent No.: US 8,161,214 B2
(45) Date of Patent: Apr. 17, 2012

(54) SYSTEM AND METHOD FOR DATA TRANSFER USING ATA INTERFACE

(75) Inventor: Souk Joung Yoon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/882,661

(22) Filed: Sep. 15, 2010

(65) Prior Publication Data

US 2011/0022740 A1 Jan. 27, 2011

Related U.S. Application Data (63) Continuation of application No. 11/750,139, filed on May 17, 2007, now Pat. No. 7,822,893.

(30) Foreign Application Priority Data

Aug. 10, 2006 (KR) .............................. 2006-0075809

(51) Int. Cl.
 *G06F 13/00* (2006.01)
 *G06F 3/00* (2006.01)
 *G06F 13/12* (2006.01)

(52) U.S. Cl. ................................ 710/74; 710/30; 710/52
(58) Field of Classification Search .................... 710/30, 710/52, 74
See application file for complete search history.

(56) References Cited

U.S. PATENT DOCUMENTS

| 7,136,995 B1 * | 11/2006 | Wann ............................ 713/153 |
| 7,165,125 B2 * | 1/2007 | Lissel et al. ..................... 710/22 |
| 2006/0095594 A1 * | 5/2006 | Chen et al. ....................... 710/5 |

* cited by examiner

*Primary Examiner* — Chun-Kuan Lee
*Assistant Examiner* — Zachary K Huson
(74) *Attorney, Agent, or Firm* — F. Chau & Associates, LLC (57) ABSTRACT

An ATA compatible data transfer system includes a system processor having system memory, the system processor configured to issue a Programmable I/O (PIO) type command to effect data transfer between a peripheral device and the system memory through a host controller and an ATA controller. The host controller accesses data to/from the host memory directly. The host controller and the ATA controller complete data transfer between the peripheral device and the system memory by executing the PIO type command without requiring interrupt servicing by the system processor.

19 Claims, 6 Drawing Sheets

Write: Device from HOST to HDD

SYSTEM AND METHOD FOR DATA TRANSFER USING ATA INTERFACE

CROSS-REFERENCE TO RELATED APPLICATION

This application is a continuation of application Ser. No. 11/750,139, filed on May 17, 2007 now U.S. Pat. No. 7,822, 893, which claims priority to Korean Patent Application No. 10-2006-0075809 filed on Aug. 10, 2006, the disclosures of which are each incorporated herein by reference in their entireties.

BACKGROUND OF THE INVENTION

1. Technical Field

The present disclosure relates to computer systems and, more particularly, to ATA compatible data transfer systems and methods of data transfer in ATA compatible data transfer systems.

2. Discussion of Related Art

Advanced Technology Attachment or AT Attachment (ATA) is a standard mass storage device bus interface used to connect devices such as hard drives, floppy disk drives, CD-ROM and DVD-ROM drives to personal computers. Technical Committee T13 for the InterNationai Committee on Information Technology Standards (INCITS) is responsible for all interface standards relating to the ATA storage interface. Several versions of the ATA interface have been defined. Generally, ATA devices store data in 512-byte blocks called sectors. Logical block addressing (LBA) mode is a means set forth by the ATA standards to allow for the linear addressing of sectors.

Intelligent/Integrated Drive Electronics (IDE) is a general term for drives with built-in disk controllers and a popular term used for ATA disk drives. Although IDE refers to a general technology, whereas ATA refers to a specific specification, the term IDE is often used as a synonym for ATA because ATA devices are also IDE devices. The IDE interface is based on the IBM PC Industry Standard Architecture (ISA) 16-bit bus standard, but it is also used in computers that use other bus standards. Enhanced IDE (EIDE) is a newer version of the IDE interface that supports data transfer rates that are about four times faster than the original IDE interface. EIDE uses logical block addressing, which allows for hard disk capacities over 528 MB. EIDE makes use of DMA (Direct Memory Access) channels and can address up to four ATA devices.

One method of transferring data over the ATA bus is through the use of programmed I/O (PIO). In PIO, the system CPU is responsible for executing the instructions that transfer the data in contiguous blocks of data that are multiples of 512 bytes between the system and the drive. The ATA Read Sectors and Write Sectors generate interrupt signals to the CPU for reading and writing each sector. This approach can place heavy demands on the CPU whenever the drive needs to transfer data, particularly multimedia data, to or from memory.

With the advent of faster host systems and devices, PIO has been expanded to include new operating modes. Each of the PIO modes, numbered zero through four, is faster than the one before. The PIO modes are defined in terms of their cycle time, representing how many nanoseconds it takes for each transfer to occur. The maximum transfer rate is the reciprocal of the cycle times doubled because the ATA interface is two bytes (16 bits) wide.

Figure 1:
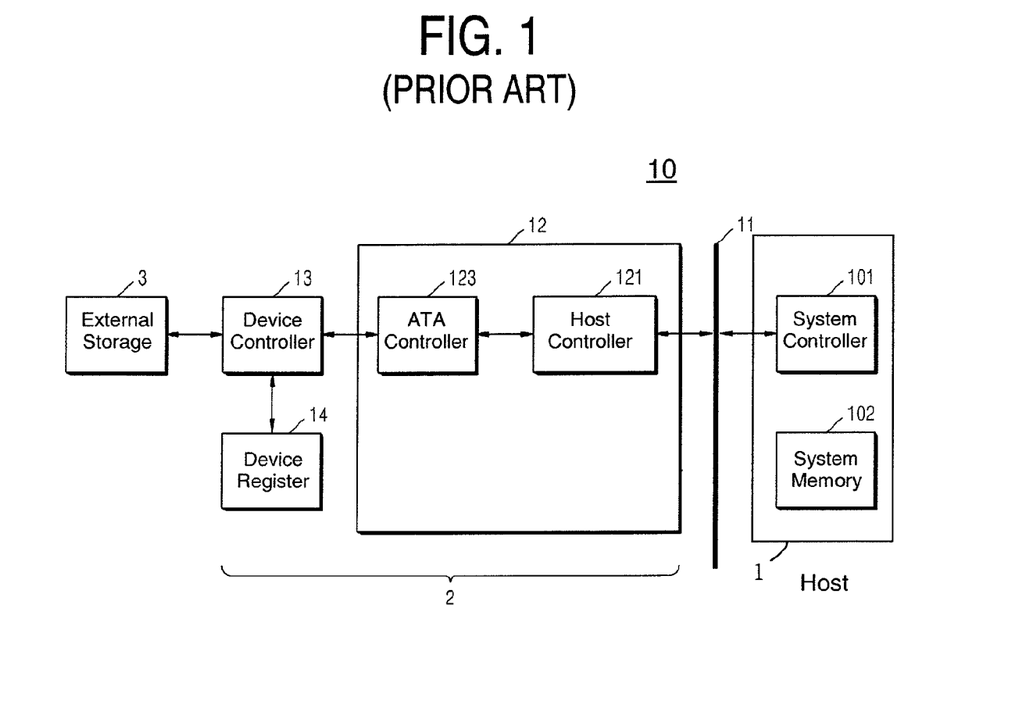
FIG. 1 is a block diagram showing a conventional programmable I/O (PIO) system.

FIG. 1 is a block diagram showing a conventional PIO system. Referring to FIG. 1, the conventional PIO system 10 includes a host 1, interface device 2, input/output (I/O) interface 11, and external storage 3. The host 1 includes a system controller 101, such as a CPU, and system memory 102. The system controller 101 sets a PIO mode (speed) and outputs a system address to host controller 121.

The interface device 2 is composed of a device host 12, a device controller 13, and a device register 14. The device host 12 includes a device controller 121 and an ATA controller 123. The device controller 13, which is coupled between the device host 12 and the device register 14, is coupled to external storage 3. The device register 14 may include a command block register and control block register. The device controller 13 accesses control data from/to the device register 14 and outputs to the ATA controller 123. The system controller 101 communicates with device controller 13 through the host controller 121 and ATA controller 123 to assert the various address, select, read/write request and enable signals (e.g., CS0n, CS1n, DIORn and DA) for access to the device controller 13 and external storage 3. In the conventional PIO system, the system controller 101 is Interrupted each time an external device, such as a hard disk drive, requires data transfer. In operations requiring extensive access to the external device, such as storage or transfer of large files to/from a hard disk, the processing resources of the system controller/CPU can be depleted. The processing load worsens when more external devices are added to the system.

As multimedia components such as DVDP (Digital Video Development Platform) drive, set-top box, personal video recorder (PVR), digital television (DTV), MP3 player, or portable multimedia player (PMP), e.g., with a Microdrive, etc. attain widespread consumer appeal and usage, system designers look to add more and more external devices to computer systems. An IDE extension protocol was developed called the AT Attachment Packet Interface or ATAPI for these devices. ATAPI facilitates external devices like optical, tape and removable storage drives to plug into the standard IDE cable used by IDE/ATA hard disks, and be configured as master or slave, etc. like a hard disk. The ATAPI protocol is similar but not identical to the standard ATA (ATA-2, etc.) command set used by hard disks. The load/burden placed on the processing resource is similar because ATAPI is also interrupt driven.

Direct Memory Access (DMA) is a transfer protocol where the data is transferred directly between drive and memory without using the CPU to perform the transaction, in contrast to PIO. There are two types of DMA: third-party DMA and first-party or bus mastering DMA. Third-party DMA uses the DMA controller built into the system to perform bus arbitration for use of the system bus to transfer the data. (The "third party" is the DMA controller.) First-party DMA allows the hard disk and system memory to work without relying on the system's DMA controller, or requiring any support from the CPU.

Over the last few years, faster data transfer rates have been achieved, using a standard commonly called "Ultra ATA", in systems equipped with the Ultra DMA protocol. Before Ultra DMA, one transfer of data occurred on each clock cycle, triggered by the rising edge of the interface clock or "strobe". Ultra DMA uses double-edge clocking. Double-edge clocking allows data to be transferred on each edge of the rising strobe, doubling the data-transfer rate without increasing the fundamental frequency of signaling on the bus. Additionally, Ultra DMA uses non-interlocked signaling. With non-interlocked signaling, the clock signal is generated by the source and sent with the data, whereas in typical synchronous clocking designs, data is transmitted from the source and clocked at the receiver using a local clock signal. Ultra DMA modes 0, 1, 2, 3 and 4 have maximum transfer rates of 16.7, 25, 33.3, 44.4 and 66.6 MB, respectively. Even using double-edge clocking, transfer rates above 33 MB/sec exceed the capabilities of the original 40-conductor standard IDE cable. To use Ultra DMA modes over 2, an 80-conductor IDE cable is required.

A need therefore exists for ATA compatible data transfer systems and methods of data transfer that facilitate increased peripheral loading yet relieves the processing load placed on the system CPU.

SUMMARY OF THE INVENTION

According to an exemplary embodiment of the present invention, an ATA compatible data transfer system includes a system processor having system memory, the system processor configured to issue a Programmable I/O (PIO) type command to effect data transfer between a peripheral device and the system memory through a host controller and an ATA controllers wherein the host controller accesses data to/from the system memory directly, and wherein the host controller and the ATA controller complete data transfer between the peripheral device and the system memory by executing the PIO type command without requiring interrupt servicing by the system processor.

According to an exemplary embodiment of the present invention, a method of data transfer in an ATA compatible data transfer system includes issuing a PIO type command from a system processor to effect data transfer between a peripheral device and system memory through a host controller and an ATA controller, performing direct memory access of data to/from the system memory, and completing data transfer between the peripheral device and the system memory by executing the PIO type command at the host controller and the ATA controller without requiring interrupt servicing by the system processor.

According to an exemplary embodiment of the present invention, an ATA compatible data transfer system includes a system processor and system memory, a host controller communicating with the system processor including a DMA controller for direct memory access of data to/from the system memory, and an ATA controller communicating with the host controller and a peripheral device, wherein the host controller and the ATA controller effects data transfer between the peripheral device and the system memory by executing a PIO type command issued from the system processor without requiring interrupt servicing by the system processor.

BRIEF DESCRIPTION OF THE DRAWINGS

The present invention will become more apparent to those of ordinary skill in the art when descriptions of exemplary embodiments thereof are read with reference to the accompanying drawings.

DESCRIPTION OF EXEMPLARY EMBODIMENTS

Hereinafter, exemplary embodiments of the present invention will be described in detail with reference to the accompanying drawings. As used herein, the term "AT Attachment" and the acronym "ATA" refers to all forms of ATA (ATA-1, ATA-2, etc., IDE, EIDE, etc.).

Figure 2:
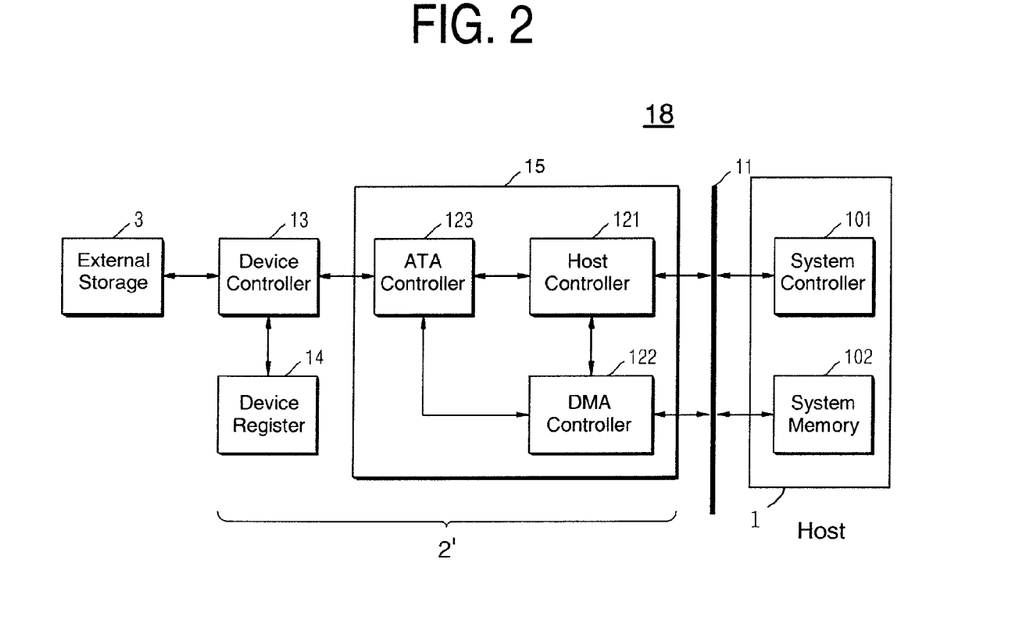
FIG. 2 is a block diagram for illustrating an ATA compatible data transfer system, according to an exemplary embodiment of the present invention.

FIG. 2 is a block diagram for illustrating an ATA compatible data transfer system having a DMA controller, according to an exemplary embodiment of the present invention. Referring to FIG. 2, the ATA compatible data transfer system 18 includes a system controller 101 having system memory 102. The system controller 101 includes a CPU to coordinate all functions of the system including effecting data transfer between external storage 3 and/or a peripheral device (not shown) and system memory 102 through a device host 15 which includes a host controller 121 and an ATA controller 123.

The host controller 121 includes a DMA controller 122 to access data to/from the system memory 102 directly. The host controller 121 and the ATA controller 123 may complete data transfer between the peripheral device and the system memory 102 by executing PIO type commands without requiring interrupt servicing by the system controller 101.

According to an exemplary embodiment of the present invention, the DMA controller 122 includes a FIFO for buffering data transferred to/from the system memory 102. The host controller 121 may determine whether the FIFO is empty or full with data and the ATA controller 123 may issue PIO signals based on the determination.

The host controller 121 and ATA controller 123 perform the interfacing functions with the system controller 101 and device controller 13 respectively as described above for FIG. 1, and in addition, the host controller 121 issues commands to DMA controller 122 to effect direct data transfer with system memory 102 without interrupting the processor of system controller 101. ATA controller 123 may issue a read or write type signal for every fixed number of bytes transferred. For example, the fixed number of bytes may be equal to one sector or 512 bytes. The read or write type signal may include column select and data address.

Figure 3:
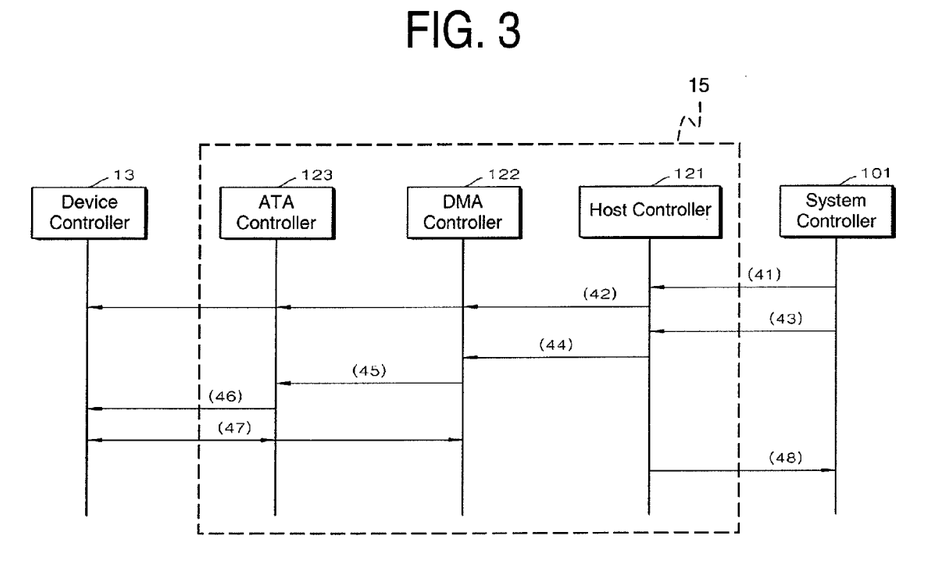
FIG. 3 is a flowchart showing an interface method using a DMA controller of FIG. 2, according to an exemplary embodiment of the present invention.

Hereinafter, an interface method using a DMA controller, according to an exemplary embodiment of the present invention, will be described with reference to FIGS. 2, 3, 5 and 6. FIG. 3 is a flowchart showing an exemplary interface method using the DMA controller 122 of FIG. 2 to directly transfer data to/from the system memory 102. In step 41, the system controller 101 chooses suitable protocol and timing parameters and stores data block register values in the host controller 121. A suitable protocol can be a known DMA protocol for effecting direct memory access. For example, the system controller 101 may poll a peripheral device, such as an ATA hard disk drive, to confirm its DMA mode settings e.g., Multiword DMA or Ultra DMA. Ultra DMA supports six data transfer modes, Mode 0 through 5, which have maximum transfer rates of 16.7, 25.0, 33.3, 44.4, 66.7 and 100.0 Mbps (megabytes per second), respectively. Ultra DMA mode cycle times range from 240 to 50 ns (nanoseconds), with Mode 0 operating at the slowest rate. Multiword DMA supports three data transfer modes, Mode 0, 1 and 2, which have maximum transfer rates of 2.1, 4.2 and 8.3 Mbps, respectively, In step 42, the host controller 121 forwards the designated protocol to the DMA controller 122. In step 43, the system controller 101 begins transmission by start command. In step 44, the host controller 121 requests the state of the FIFO buffer from DMA controller 122. The DMA controller 122 determines whether the FIFO buffer is full and reports the results to the ATA controller 123, in step 45.

Figure 5:
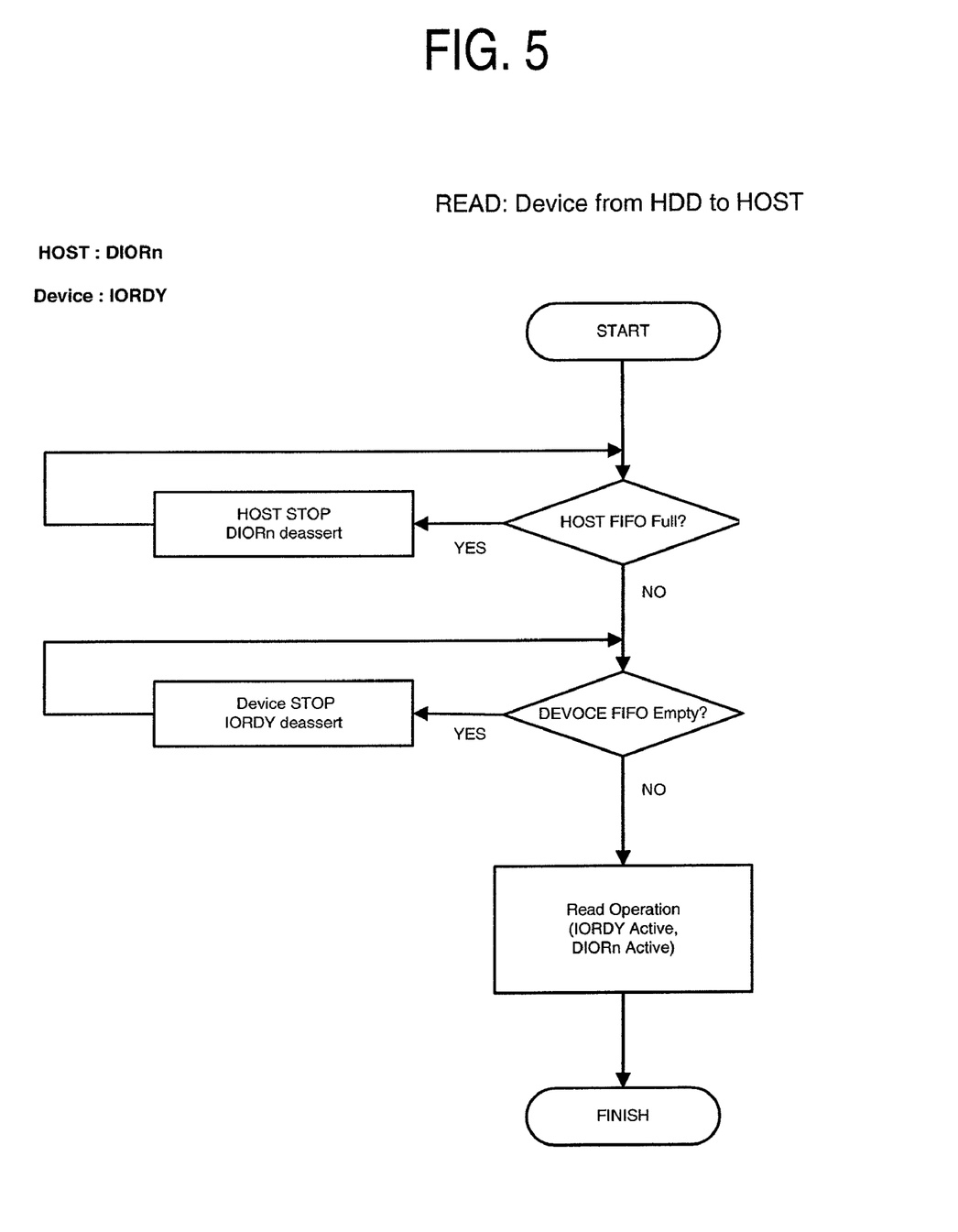
FIG. 5 is a flowchart for illustrating signals for a read mode of operation, according to an exemplary embodiment of the present invention.

FIG. 5 shows an exemplary READ from external device to host operation. When the FIFO buffer in the DMA controller 122 is full, for example, because data from the system controller 101 temporarily does not secure the system BUS, READ signal DIORn is deasserted and transmission is stopped. When data does secure the system BUS, DIORn is asserted. When reading data from external storage 3, ready signal IORDY may be asserted by device controller 13 and RIORn may be asserted by host controller 121.

Figure 6:
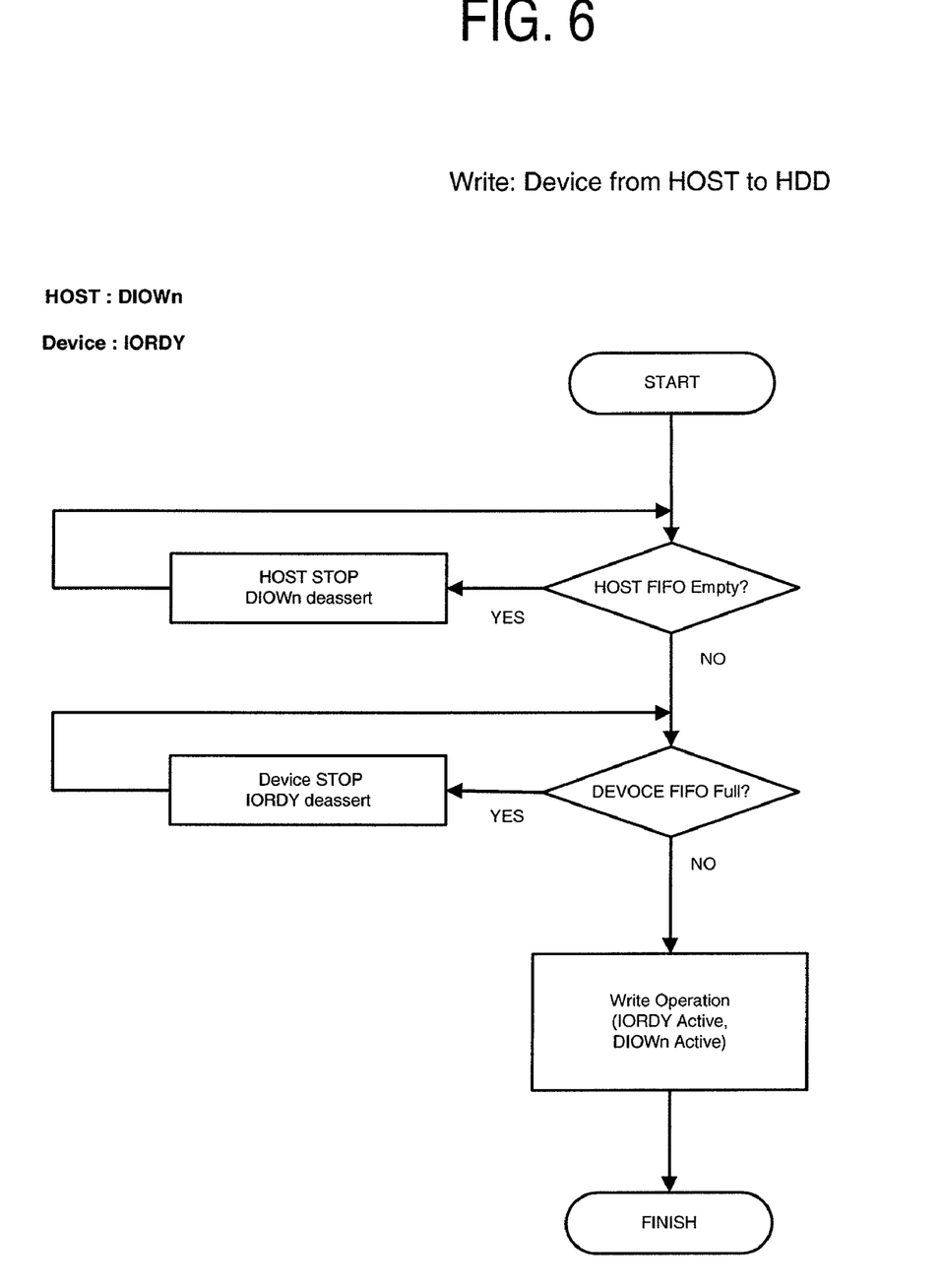
FIG. 6 is a flowchart for illustrating signals for a write mode of operation, according to an exemplary embodiment of the present invention.

In a write mode of operation (FIG. 6), when the FIFO buffer is empty, Write signal DIOWn is deasserted and transmission is stopped. FIG. 6 is a flowchart for illustrating signals for a write mode of operation, according to an exemplary embodiment of the present invention. For example, when writing data from external storage 3, IORDY may be asserted by device controller 13 and DIOWn may be asserted by host controller 121.

When reading data from external storage 3 and the FIFO buffer of device controller 13 is empty, or when writing data to external storage 3 and the FIFO buffer is full, the host controller 121 pauses transmission and deasserts the IORDY signal. When IORDY is deasserted, the system controller 101 stops read/write operations until IORDY is resumed.

Referring again to FIG. 3, in step 46, the ATA controller 123 generates signals select signals CS0n, CS1n, which select read/write, DA[2:0]> which is address device register 14, and strobe signals DIORn (read strobe) and DIOWn (read strobe) according to the designated transmission speed. The signals generated by the ATA controller 123 are transmitted to the device controller 13 unless the FIFO buffer is full.

In step 47, the device controller 13 transmits data between the external storage 3, device register 14 and system memory 102 using the ATA controller 123 and the DMA controller 122. In an exemplary embodiment of the present invention, when the data size exceeds one sector, 512 bytes, the DMA controller 122 can transmit data directly without interrupt command of system controller 101. The DMA controller 122 may read/write data directly from/to the device register 14 through the ATA controller 123.

In step 48, the DMA controller 122 outputs a completion signal to the host controller 121. The host controller 121 supplies a completion interrupt to the system controller 101 and stands by for a next command.

Hereinafter is described a method of data transfer in an ATA compatible data transfer system according to an exemplary embodiment of the present invention.

A method of data transfer in an ATA compatible data transfer system, according to an exemplary embodiment of the present invention includes issuing a PIO type command from a system controller 101 to effect data transfer between a peripheral device and system memory 102 through a host controller 121 and an ATA controller 123, performing direct memory access of data to/from the system memory 102, and completing data transfer between the peripheral device and the system memory 102 by executing the PIO type command at the host controller 121 and the ATA controller without requiring interrupt servicing by the system controller 101.

In an exemplary embodiment of the present invention, a method of data transfer in an ATA compatible data transfer system includes buffering data transferred to/from the system memory 102 using a FIFO included in the host controller 121. For example, this may include testing the FIFO for presence of data and issuing PIO signals at the ATA controller 123 based on the test result.

In an exemplary embodiment of the present invention, a method of data transfer in an ATA compatible data transfer system includes issuing a read or write type signal at the ATA controller 123 for every fixed number of bytes transferred. For example, the fixed number of bytes may be equal to one sector or 512 bytes. The read or write type signal may include column select and data address.

A method of data transfer in an ATA compatible data transfer system, according to an exemplary embodiment of the present invention, includes signaling to the system controller 101 by the host controller 121 upon completion of the data transfer pursuant to a PIO type command.

Figure 4:
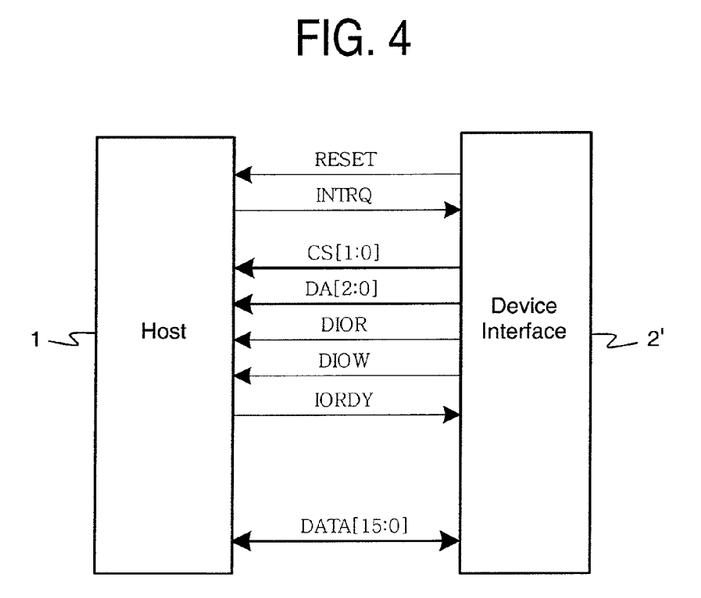
FIG. 4 is a block diagram for illustrating signals defined by ATA standards used for a PIO-DMA method, according to an exemplary embodiment of the present invention.

FIG. 4 is a block diagram for illustrating signals defined by ATA standards used for a PIO-DMA method, according to an exemplary embodiment of the present invention. Referring to FIG. 4, the signals RESET. CS[1:0], DA[2:0], DIOR and DIOW are given by the device interface 2' to host 1. The signals INTRO and IORPY are given by the host 1 to the device interface 2'. The signal DATA[15,0] may be given by the device interface 2' to host 1 and vice versa.

Figure 7:
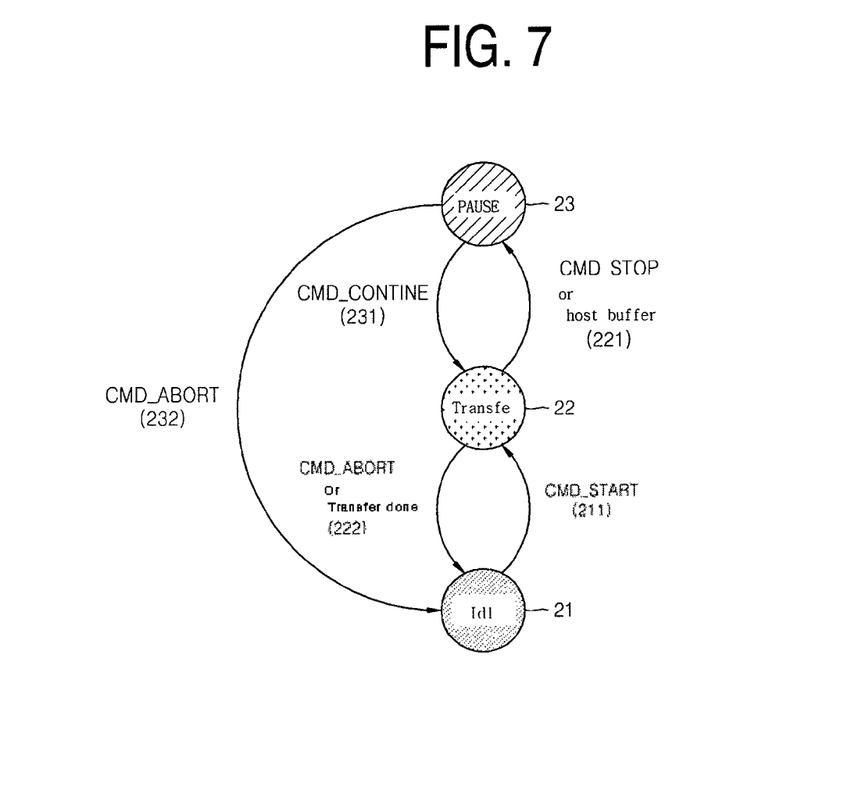
FIG. 7 is a state diagram for illustrating examples of PIO-DMA commands, according to an exemplary embodiment of the present invention.

FIG. 7 is a state diagram for illustrating examples of PIO-DMA commands, according to an exemplary embodiment of the present invention. Referring to FIG. 7, if the system is in Idle mode 21, and the system controller 101 gives the start command CMP_START 211, then the system transitions to the transfer mode 22.

If the system is in Transfer mode 22, and the system controller 101 gives the stop command CMD_STOP or host buffer is full 221, then the system transitions to Pause mode 23 and transmission is stopped. If the system is in Transfer mode 22, and an abort command CMD_ABORT or transfer done 222 is received, then the system transitions to Idle mode 21.

If the system is in Pause mode 23, and the continue command CMD_CONTINUE 231 is received, then the system transitions to Transfer mode 22 and transmission is resumed. If the system is in Pause mode 23, and abort command CMD_ABORT which is received, then transmission is aborted and the system transitions to Idle mode 21.

Figure 8:
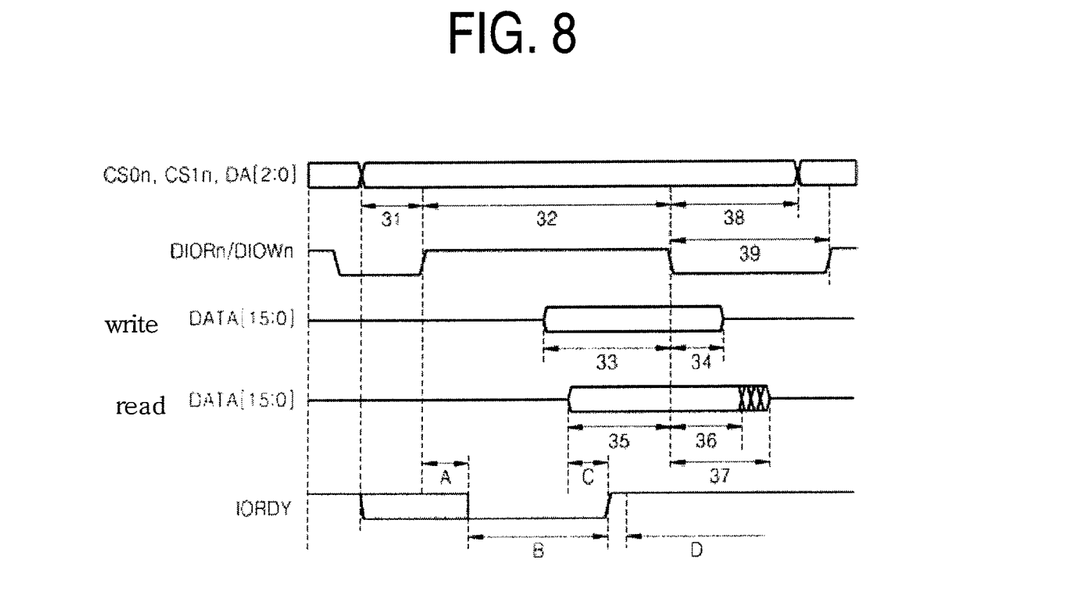
FIG. 8 is a timing diagram for illustrating examples of signals for PIO-DMA data transmission according to an exemplary embodiment of the present invention.

FIG. 8 is a timing diagram for illustrating examples of signals for PIO-DMA data transmission, according to an exemplary embodiment of the present invention. Referring to FIG. 8, in the top line of the timing diagram, CS0n, CS1n, DA[2:0] is the ATA standard signal line used to access the device register 14 from the ATA controller 123.

ATA controller 123 data DIORn/DIOWn is deasserted in time interval 31. DIORN/DIOWn is asserted in time interval 32. Minimum cycle of DIORn/DIOWn is time interval 38. The slowest time of time interval 38 is 600 ns (1.66 MHz). The fastest time of time interval 38 is 120 ns (8.33 MHz).

Time intervals 33 and 35 represent minimum setup times. Time intervals 34 and 36 represent minimum hold times. Data is read during time interval 36. Time interval 37 represents address hold time.

When FIFO buffer of device interface 2 is full or empty, device controller 13 deassert IORDY. At the bottom of the timing diagram, the time interval designated "A" represents setup time. The time interval designated "B" represents maximum disable time. The time interval designated "C" represents effective time for data processing.

Figure 9:
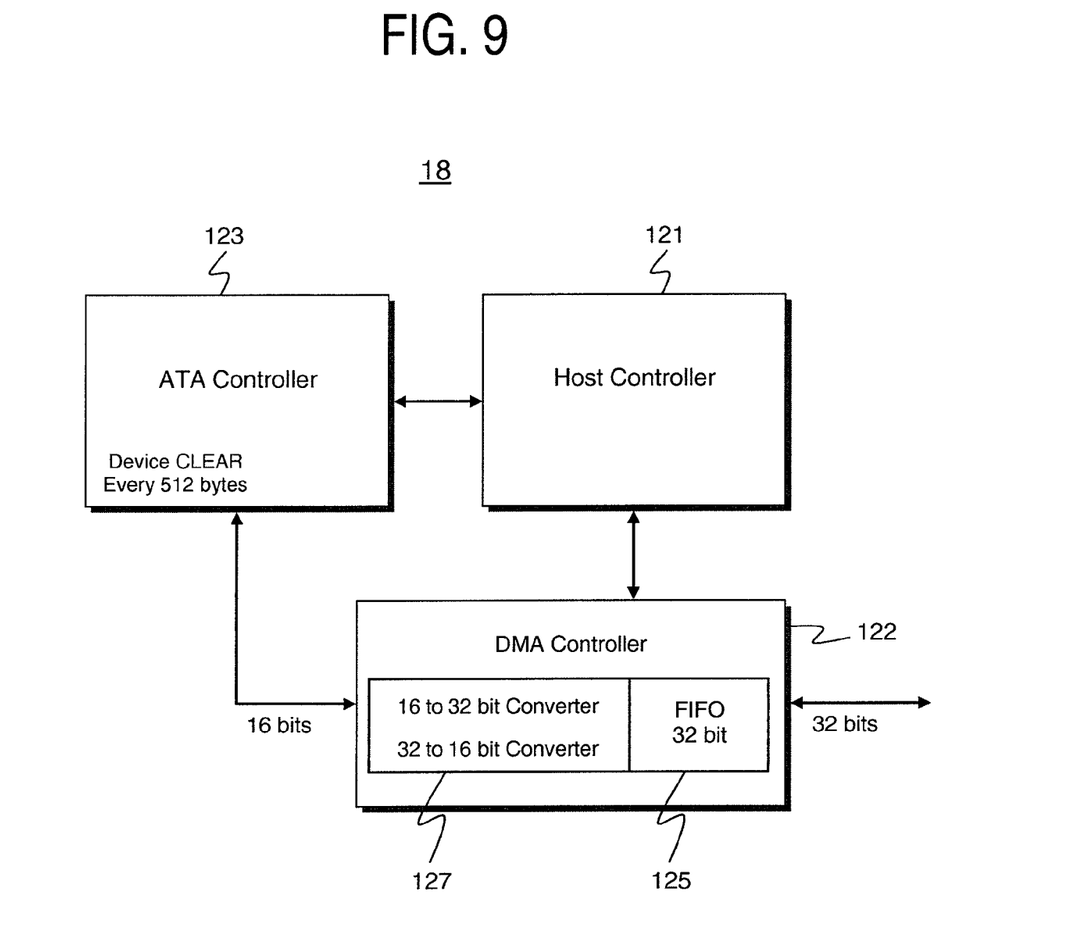
FIG. 9 is a block diagram for illustrating a DMA controller of the ATA compatible data transfer system of FIG. 2, according to an exemplary embodiment of the present invention.

Hereinafter, an ATA compatible data transfer system, according to an exemplary embodiment of the present invention, will be described with reference to FIGS. 2 and 9. FIG. 9 is a block diagram for illustrating a DMA controller of the ATA compatible data transfer system of FIG. 2 according to an exemplary embodiment of the present invention.

Referring to FIGS. 2 and 9, an ATA compatible data transfer system includes a system controller 101 and system memory 102, a host controller 121 communicating with the system controller 101 including a DMA controller 122 for direct memory access of data to/from the system memory 102, and an ATA controller 123 communicating with the host controller 121 and a peripheral device, for example, external storage 3.

The host controller 121 and the ATA controller 123 effects data transfer between the peripheral device and the system memory 102 by executing a PIO type command issued from the system controller 101 without requiring interrupt servicing by the system controller 101.

The DMA controller 122 may include a FIFO, for example, a 32-bit FIFO 125 shown in FIG. 9, for buffering data transferred to/from the system memory 102 via DMA. The host controller 121 may view the FIFO 125 for presence of data and the ATA controller 123 may issue PIO signals based on the presence or absence of data at the FIFO 125. For example when the host controller determines that the FIFO is full during a read transaction, the ATA controller deasserts a PIO read signal and data transmission is stopped, and when the host controller determines that the FIFO is empty during a write transaction, the ATA controller deasserts a PIO write signal and data transmission is stopped. The DMA controller 122 may include a 16-to-32 bit converter and/or a 32-to-16 bit converter 127. For example, a 16-to-32 bit converter may convert 16-bit data transmitted from the ATA controller 123 to feed a 32-bit FIFO data buffer 125 included in the DMA controller 122. Data from the 32-bit FIFO data buffer 125 may be converted to 16-bit data using a 32-to-16 bit converter and transmitted to the ATA controller 123.

The ATA controller 123 may issue a read or write type signal for every fixed number of bytes transferred. For example, the fixed number of bytes may be equal to one sector or 512 bytes. The read or write type signal may include column select and data address.

According to an exemplary embodiment of the present invention, it is contemplated that with the operation of the host controller, ATA controller, and DMA controller in concert to effect data access from a peripheral and then direct memory access to/from the system memory without requiring interrupt servicing from the system processor of the system controller, the system controller can be processing other data, such as media data including MPEG data, while data is being directly transferred between the peripheral device to the host controller and the system memory.

While exemplary embodiments of the present invention are described above in connection with an external storage device such as a hard disk drive (HDD), other external media handling components such as a DVDP (Digital Video Development Platform) drive, set-top box, personal video recorder (PVR), digital television (DTV), MPEG players including MP3 player, or portable multimedia player (PMP), e.g., with a Microdrive are suitably applicable for use in a DMA PIO transfer according to at least one embodiment of the present invention.

Although exemplary embodiments of the present invention have been described in detail with reference to the accompanying drawings for the purpose of illustration it is to be understood that the inventive processes and apparatus are not to be construed as limited thereby. It will be readily apparent to those of ordinary skill in the art that various modifications to the foregoing exemplary embodiments can be made without departing from the scope of the invention as defined by the appended claims, with equivalents of the claims to be included therein.

What is claimed:

1. An Advanced Technology Attachment or AT Attachment (ATA) compatible data transfer system comprising:

a host controller configured to interface with a system controller of an external host;

an ATA controller configured to interface with a system memory of the host; and a direct memory access (DMA) controller, wherein the DMA controller includes a buffer, wherein the buffer buffers data exchanged between the system memory and the data transfer system via a direct memory access by the DMA controller, wherein the host controller is configured to view the buffer to determine whether the buffer is full during a read transaction and whether the buffer is empty during a write transaction, wherein the ATA controller is configured to deassert a programmed input/output (PIO) read signal to stop data transmission in response to the determination that the buffer is full during the read transaction, wherein the ATA controller is configured to deassert a PIO write signal to stop data transmission in response to the determination that the buffer is empty during the write transaction, and wherein the host, ATA, and DMA controllers are distinct from one another.

2. The system of claim 1, wherein the buffer is a first-in-first-out buffer.

3. The system of claim 1, wherein the DMA includes a 16-to-32 bit converter to convert 16-bit data of the ATA controller to 32-bit data for storage in the buffer and a 32-to-16 bit converter to convert 32-bit data of the buffer for transmission to the ATA controller.

4. The system of claim 1, wherein the ATA controller issues a read or a write type signal for every fixed number of bytes transferred.

5. The system of claim 4, wherein the fixed number of bytes is 512 bytes.

6. The system of claim 1, wherein the ATA controller issues a read or a write type signal which includes a column select.

7. The system of claim 6, wherein the read or write type signal includes a data address.

8. The system of claim 1, wherein the host controller is configured to effect a data transfer between a peripheral device and the system memory in response to a PIO type command from the system controller and outputs a completion signal to the system controller when the data transfer has completed.

9. A method of data transfer in an Advanced Technology Attachment or AT Attachment (ATA) compatible data transfer system, the method comprising:

forwarding, by a host controller of the system, a direct memory access protocol (DMA) received from a system controller of an external host to a DMA controller of the system;

requesting, by the host controller, upon receipt of a start command from the system controller, a state of a buffer of the DMA controller from the DMA controller;

determining, by the host controller, results of whether the buffer is full based on the state;

reporting, by the host controller, the results to the ATA controller;

transmitting, by the ATA controller, select signals to an external device controller only when the results indicate that the buffer is less than full; and transmitting, by the host controller and the ATA controller, data from the device controller to a system memory of the external host when the select signals are sent.

10. The method of claim 9, further comprising deasserting a programmed input/output (PIO) read signal by the ATA controller to stop the data transmission when the results indicate that the buffer is full during a read transaction.

11. The method of claim 9, further comprising deasserting a programmed input/output (PIO) write signal by the ATA controller to stop the data transmission when the results indicate the buffer is empty during a write transaction.

12. The method of claim 9, wherein the start command is a programmed input/output (PIO) type command.

13. The method of claim 9, further comprising outputting by the DMA controller a completion signal to the system controller when the data transfer has completed.

14. An Advanced Technology Attachment or AT Attachment (ATA) compatible data transfer system comprising:
 a host controller configured to interface with a system controller of an external host
 an ATA controller configured to interface with a system memory of the host; and
 a direct memory access (DMA) controller, wherein the DMA controller includes a buffer, wherein the buffer buffers data exchanged between the system memory and the data transfer system via a direct memory access by the DMA controller, wherein the host controller is configured to view the buffer to determine whether the buffer is full during a read transaction and whether the buffer is empty during a write transaction, wherein the ATA controller is configured to deassert a programmed input/output (PIO) read signal to stop data transmission in response to the determination that the buffer is full during the read transaction, wherein the ATA controller is configured to deassert a PIO write signal to stop data transmission in response to the determination that the buffer is empty during the write transaction, and wherein the host controller is configured to forward a DMA protocol received from the system controller to the DMA controller.

15. The system of claim 14, wherein the host controller is configured to effect a data transfer between a peripheral device and the system memory in response to a PIO type command from the system controller and outputs a completion signal to the system controller when the data transfer has completed.

16. The system of claim 14, wherein the buffer is a first-in-first-out (FIFO) buffer.

17. The system of claim 14, wherein the DMA includes a 16-to-32 bit converter to convert 16-bit data of the ATA controller to 32-bit data for storage in the buffer and a 32-to-16 bit converter to convert 32-bit data of the buffer for transmission to the ATA controller.

18. The system of claim 14, wherein the ATA controller issues a read or a write type signal which includes a column select.

19. The system of claim 18, wherein the read or write type signal includes a data address.

* * * * *